Jan. 13, 1959     F. SCHMIDT ET AL     2,868,589
ARRANGEMENT FOR REMOVING STABLE DUNG FROM STABLES
Filed May 19, 1955     2 Sheets-Sheet 2
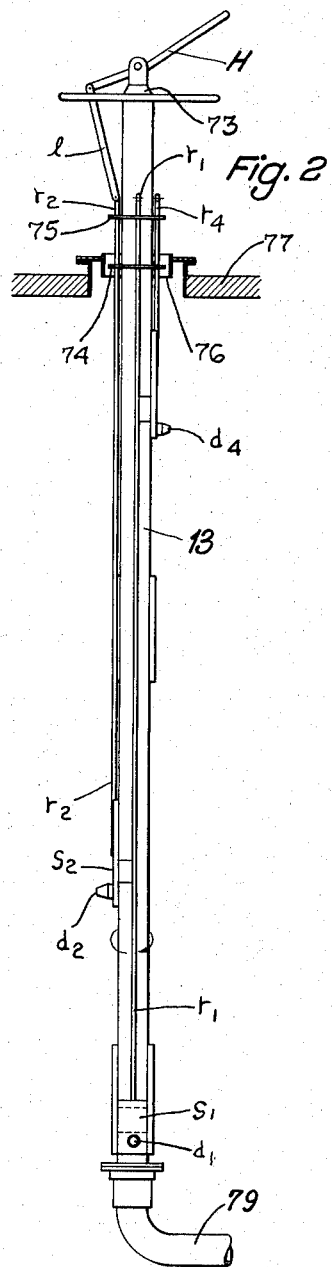
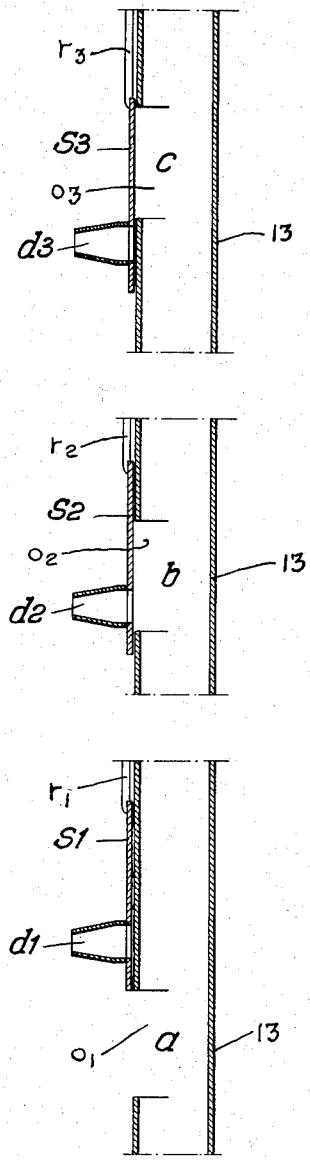
Inventors:
Ferdinand SCHMIDT
Walter EGGERSGLUESS
Henry K. Feist
ATTORNEY.

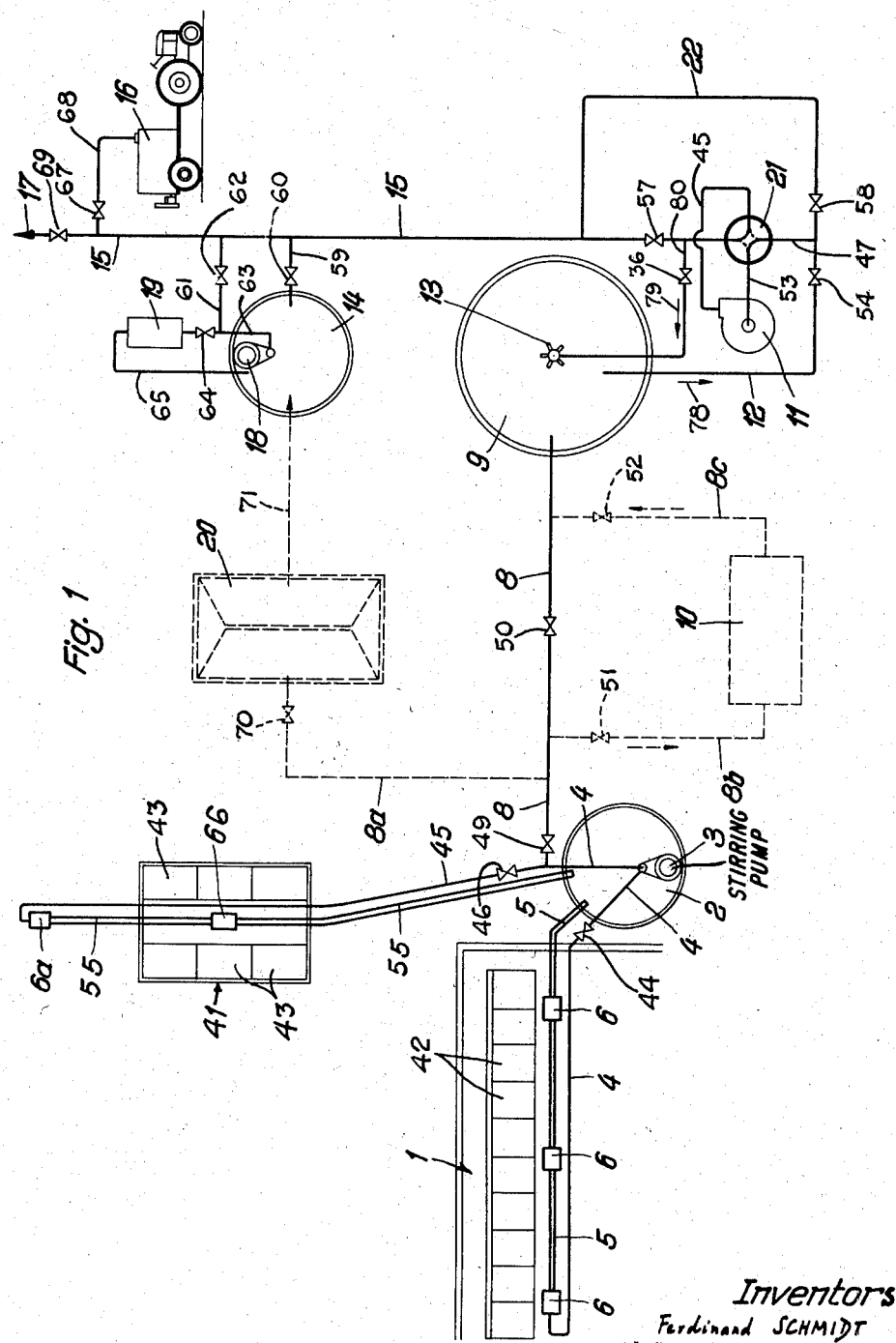

United States Patent Office 2,868,589
Patented Jan. 13, 1959

2,868,589

ARRANGEMENT FOR REMOVING STABLE DUNG FROM STABLES

Ferdinand Schmidt, deceased, and Walter Eggersgluess, Verden, Aller, Germany; Eva-Marie M. H. Eggersgluess, nee Schmidt, sole heir of said Ferdinand Schmidt Application May 19, 1955, Serial No. 509,601

13 Claims. (Cl. 302—14)

The present invention relates to a method and an arrangement for removing stable dung from stables.

It is an object of the present invention to save considerably in labor involved in the conveyance of stable dung from the cattle barn to the place of use such as a field.

It is another object of the present invention to store the stable dung in such a manner that nutritional losses of the same are avoided or at least lessened.

It is a further object of the present invention to avoid any access of air to the stable dung.

Other objects and advantages of the present invention will be apparent from the following detailed description thereof, in connection with the accompanying drawings showing, by way of example, an embodiment of an arrangement according to the present invention. In the drawings Fig. 1 is a plan of an arrangement according to the present invention, Fig. 2 is a side elevation on an enlarged scale of a part of Fig. 1, and Fig. 3 is a longitudinal section on a still more enlarged scale of certain parts shown in Fig. 2.

Referring now to the drawings, a cattle barn (not shown) contains stables such as 1 and 41 which are provided with partitions such as 42 and 43 defining compartments for the cattle. The dung accumulating in the stables 1 and 41 is removed from the same by pipes 5 and 45, each having at least a portion which is inclined and which are operated as follows:

A tank or reservoir 2 is arranged in a central position in the barn (not shown) containing the stables 1 and 41. In the tank 2 pumping means 3 is arranged so that the suction side (not shown) thereof opens just above the bottom of the tank 2. Pipes 4 and 45 are connected with the suction side of the pumping means 3. The pipes 4 and 45 are provided with preferably hand-operated valve means 44 and 46, and connected with ducts 5 and 55 provided, respectively, with inlet openings 6 and 66 for the dung. The ducts 5 and 55 may be formed by cement or clay pipes, or consist of any other suitable material. The dung inlet openings 6 and 66 are preferably shaped as chutes covered by gratings (not shown) arranged approximately at the level of the floor of the barn. Thus droppings fall into the openings 6 or 66 which collect also any water used for washing the stables such as 1 and 41.

The pipe 45 is connected by a preferably hand-operated valve means 49 with a pipe 8 provided with a preferably hand-operated valve means 50. The pipe 8 leads to a storage container or manure silo 9.

If desired, a pipe line 8b provided with preferably hand-operated valve means 51 connects the pipe 8 with a plant 10 in which the dung is biologically decomposed. The tank 10 is connected by a pipe line 8c containing a preferably hand-operated valve means 52 with that part of the pipe 8 which leads into the storage container 9. As will be seen from Fig. 1 the pipe lines 8b and 8c with the plant 10 form a parallel connection to the valve means 50 of the pipe 8.

The pipe 13 is arranged along the axis of the storage container 9 and will be described more in detail with reference to Figs. 2 and 3.

A pump 11 is connected with the suction side thereof to a pipe 53 which is connectable by connecting means such as a four-way valve 21 to a pipe 47 connected with a pipe 12 provided with preferably hand-operated valve means 54. The pressure side of the pump 11 is connected with a pipe 45 connectable by the four-way valve 21 with a preferably hand-operated valve means 36 arranged in a pipe 79 connected to the bottom part of the pipe 13 arranged along the axis of the storage container 9, and by a valve 57 with a pipe line 15. A pipe 22 provided with preferably hand-operated valve means 58 connects the pipe 47 with the pipe 15 beyond the valve means 57.

A mixing reservoir 14 is connected by a pipe line 59 provided with a preferably hand-operated valve 60 with the pipe 15 which is also connected by a pipe 61 provided with preferably hand-operated valve means 62 with a pipe 63 connected to the suction side of a pump 18 arranged in the reservoir 14. The pipes 61 and 63 are connected by a preferably hand-operated valve 64 with a fragmentizing and emulsifying device 19 connected with a pipe 65 opening into the mixing reservoir 14.

Beyond the pipe 61 the pipe 15 is connected by a preferably hand-operated valve 67 with a pipe 68 leading to a manure spreader 16. Furthermore the pipe 15 is connected by a preferably hand-operated valve 69 with a sprinkler system 17 or the like.

The pipe 8 is connected by a pipe 8a provided with a preferably hand-operated valve 70 to a manure pile 20 connected by a pipe 71 with the collecting reservoir 14.

If desired, an open air removal point 6a which is situated for instance in a pig enclosure may be connected with the duct 55.

Referring now to Figs. 2 and 3, it will be seen that the pipe 13 is arranged substantially vertical. The pipes 13 include a plurality of sections a, b, c, . . . having openings such as o1, o2, o3, . . . which may be closed, respectively, by slides s1, s2, s3, . . . provided, respectively, with nozles d1, d2, d3, . . . Fig. 3 shows three sections a, b, c, of pipe 13 with the slides s1, s2, s3, and the nozzles d1, d2, d3, thereof turning to the same side. However, it should be understood that the slides s1, s2, s3, . . . are displaced against one another as clearly shown in Fig. 2 so that they are spaced or in staggered relation to one another about the axis of the tube 13 by angles of 90°. Each of the slides s1, s2, s3, . . . is connected with an actuating rod r1, r2, r3, . . . which may be selectively coupled with a lever 1 connected to an actuating lever H arranged on top of the closed upper end 73 of the pipe 13. The rods r1, r2, r3, . . . are returned to the slide closing positions thereof by gravity or return springs (not shown) or the like. The rods r1, r2, . . . are guided in two rings 74 and 75 the lower one 74 of which is arranged concentrically with a sleeve 76 connected with a lid 77 arranged at the upper end of the storage container 9.

The operation of this device is as follows:

With the valve 49 being closed and the valves 44 and 46 being open, the pump 3 sucks liquid from the dung reservoir 2 and forces the same through pipes 4 and 45, into the dung removal ducts 5 and 55. The gratings (not shown) of the chutes 6 and 66 are removed and the stable manure consisting of excrements and chopped straw runs through the chutes 6 and 66 into the removal ducts 5 and 55. The dung is then flushed by the stream of liquid into the dung removal ducts 5 and 55 from which they enter the reservoir 2 at the top thereof, so that the straw and the particles forming the excrements remain on the surface of the liquid whereas the liquid accumulates in the lower part of the reservoir 2 from which it is pumped by the pump 3 and is forced once more through the pipes 4 and 45 into the dung removal ducts 5 and 55.

It should be understood that all dung removal points may discharge into the same reservoir 2 provided that the drain pipes 5 and 55 are suitably arranged. Furthermore, certain dung removal points such as 6a may be arranged in the open, for example in pig enclosures, and connected to the cycle of the reservoir 2, for instance by connecting the dung removal point 6a to the pipe 55.

After the removal of the dung is completed a uniform pulp is produced in the reservoir 2 from the materials brought in by means of the dung pump 3 which is preferably also designed as a stirring pump which stirs the pulp in the liquid filling the reservoir 2.

After a uniform pulp has been produced in the reservoir 2 the valves 44 and 46 are closed so that the circulation of the liquid through the pipes 4, 45, and the ducts 5, 55 is interrupted. Then the valve 49 is opened so that the pulp is conveyed through the pipe 8 and the opened valve 50 into the storage container or manure silo 9, in which the pulpy stable dung or rotted slime is stored for a certain time so that it forms a floating surface which may reach the consistency of a solid. Owing to the considerable strength of this floating surface it is difficult or even impossible to break up the cover or floating surface by means of an ordinary stirring apparatus.

If desired the dung may be conveyed from the tank 2 to the plant 10 inserted into the pipe lines 8b and 8c and thereafter to the storage container 9. In this case, the valve 50 has to be closed and the valves 51 and 52 are in open position. The plant 10 is a device for the biological decomposition of the dung which is left to rot in the plant 10 and is then pumped through the pipe line 8c into the manure storage silo 9 in which it may remain until it is spread on the fields.

If desired, however, the dung may be passed through a pipe 8a and the valve 70 to the manure pile 20 connected by the pipe 71 with the collecting reservoir 14, or even with the reservoir 2 described hereinabove. If the pipe 71 leads into the reservoir 14 the pulpy mass from the manure pile 20 may be transferred in the manner more fully described hereinafter and brought to the field by means of a suitable manure wagon 16 which is preferably provided with stirring, controlling, and distributing devices (not shown).

The storage container 9 is provided with a device for generating a spraying jet which allows to break up the floating surface formed after a time on the liquid in the storage container or manure silo 9. The pump 11 sucks in the bottom part of the liquid from the manure silo 9 and with the valve 54 in open position forces the liquid through the pipe 47 into the pipe 45 connected in one position of the four-way valve 21 to the pipe 79 connected through the open valve 36 with the pipe 13 being arranged along the axis of the storage container 9. The valve 57 should be in closed position when the pump 11 delivers the liquid to the pipe 13.

The pipe 13 as shown in Figs. 2 and 3, is provided with different sections such as a, b, c, having openings such as o1, o2, o3, which may be closed by slides s1, s2, s3, carrying the nozzles d1, d2, d3. The slides s1, s2, s3, have a length exceeding that of the associated openings o1, o2, o3, . . . so that they may completely shut off the openings associated therewith. The slides s1, s2, . . . and the nozzles d1, d2, . . . may be operated selectively by the lever H through the lever 1 and the rods r1, r2, r3, . . . each at a time. If one of the rods, say r1, is lifted the associated slide s1 is lifted so that the opening o1 of the section a is set free by the slide s1. When, however, rod r1 is not in lifted position the slide s1 covers the opening o1 arranged in front of the section a and no connection of the section a is established through the nozzle d1 arranged in the lower portion of the slide s1.

In Fig. 3 the slide s1 is shown in raised position to such an extent that the opening o1 of the section a is opened whereas the slide s2 is shown in a position in which it closes the opening o2; however, the nozzle d2 establishes a connection of the interior of the pipe 13 with the liquid in the storage container 9. The slide s3, however, is shown in a position shutting off the opening o2 completely and even the nozzle d3 is inactive in the position shown in the upper part of Fig. 3. It should be understood that the slides s1, s2, . . . are arranged in positions displaced with respect to one another about the axis of the pipe 13, the actuating device H, 1 being rotatable about the vertical axis of the pipe 13 and being engageable with one of the rods r1, r2, r3, . . . at a time.

The change-over from the suction side to the pressure side of the pump 11 and vice versa is effected by means of the four-way valve 21. In the position of the valve 21 shown in full lines in Fig. 1 a thin slime is drawn off from the storage container 9 through the pipe 12 and is conveyed through the pipes 47, 53, the pump 11, the pipes 45 and 80 to the pipe 13 connected to the spraying devices shown in Figs. 2 and 3. Thus the liquid flows along the arrows 78 and 79 shown in Fig. 1. When the four-way valve 21 is brought to the other position thereof, the pipe 53 is connected with the pipe 15, and the pipe 47 with the pipe 45 so that the flow of the liquid has a direction opposite to that indicated by the arrows 78 and 79. The thick pulpy manure may then be pumped through pipe lines 22 and 15 into the manure cart 16 or into the pipe line 17 connected to a sprinkling system (not shown).

If desired, however, the pulp may be conveyed through the pipe 59 and the valve 60 into the mixing reservoir 14 or into the reservoir 2 if the pipe 59 ends in the same. The contents of the reservoir 14 are properly stirred and may be conveyed through the pipe line 15 to the manure spreader 16 or to the pipe 17 connected with a sprinkling system (not shown). In many cases it is found desirable to add additional chopped straw and/or artificial fertilizers such as potash, nitrogen, and phosphoric acid in order to obtain composite fertilizers. In order to mix the contents of the tank 14 thoroughly they are pumped by the pump 18 in a cycle as described hereinbefore so that in the fragmentizing and emulsifying device 19 a very uniform manure pulp is obtained which may then be conveyed through the pipe line 15 into the manure cart 16 or the pipe 17 leading to the sprinkling system (not shown).

If desired, the removal ducts or pipes 5 and 55 provided with the inlet openings 6 or 66 may be used for ventilating the barns or stables 1 or 41 which can be achieved by installing an exhauster rotary fan or the like (not shown) at a suitable place, for instance in the upper part of the collecting tank or reservoir 2. The ducts 5 and 55 should in this case open above the normal level of the liquid in the tank or reservoir 2 so as to serve as ventilating ducts, if desired.

The inlet openings 6, 66 mentioned hereinabove are suitably designed so that the collecting troughs behind the cattle stands are extended as far as the feed shafts (not shown) having top openings ordinarily covered by metal plates, gratings or the like (not shown) so that they may be safely walked over and are uncovered only for the purpose of removal of the dung.

We have described hereinbefore a preferred embodiment of an arrangement for removing stable dung from stables. However, it should be understood that numerous changes may be made in form, construction, and arrangement of the several parts of the arrangement for removing stable dung from stables without departing from the spirit or scope of our invention or sacrificing any of its attendant advantages, the arrangement described herein and shown in the drawings being solely for the purpose of illustrating our invention.

We claim:

1. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for conveying the contents of said tank to said storage container, a pipe arranged rotatably along the axis of said storage container, said pipe having a plurality of sections arranged in different axial positions along the axis of said storage container, means associated with said sections of said pipe for connecting said sections with the interior of said storage container, and pump means operatively connected to said pipe and said storage container and constituting therewith a closed fluid circuit for the circulation and mixing of the contents of said storage container.

2. An arrangement as claimed in claim 1, said connecting means including a plurality of suction openings associated with said sections of said pipe.

3. An arrangement as claimed in claim 2, said connecting means including a plurality of nozzle-like jet openings associated, respectively, with said suction openings.

4. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for conveying the contents of said tank to said storage container, a pipe arranged rotatably along the axis of said storage container, said pipe having a plurality of sections arranged in different axial positions along the axis of said storage container, a plurality of slides associated, respectively, with said sections of said pipe, and being adapted to close a plurality of suction openings associated with said sections of said pipe, a plurality of discharge nozzles being arranged, respectively, on said slides associated with said sections of said pipe, said slides being adjustable so as to close said suction openings and said nozzles, and pump means operatively connected to said pipe and said storage container and constituting therewith a closed fluid circuit for the circulation and mixing of the contents of said storage container.

5. An arrangement as claimed in claim 4, said slides being arranged, respectively, at different heights and at different portions of the perimeter of the cross-section of said heights, an operating device arranged above the upper end of said pipe, and linkage means connecting said operating device with said slides.

6. An arrangement as claimed in claim 5, said operating device being connectable by said linkage means with each of said slides.

7. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for conveying the contents of said tank to said storage container, a pipe arranged rotatably along the axis of said storage container, said pipe having a plurality of sections arranged in different axial positions along the axis of said storage container, a pipe line having an inlet arranged in said storage container, a second pump having a pressure side and a suction side, and means for connecting, respectively, said pipe line with said pressure side and said suction side of said second pump, the pressure side of said second pump being connected to said pipe.

8. An arrangement as claimed in claim 7, said connecting means including a four-way valve connectable arbitrarily with said pressure side and said suction side of said pump.

9. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for connecting said tank with said storage container, a second tank for the biological decomposition of the dung, means for connecting said second tank in parallel to said means for connecting said tank with said storage container, a pipe arranged rotatably along the axis of said storage container, said pipe having a plurality of sections arranged in different axial positions along the axis of said storage container, means associated with said sections of said pipe for connecting said sections with the interior of said storage container, and pump means operatively connected to said pipe and said storage container and constituting therewith a closed fluid circuit for the circulation and mixing of the contents of said storage container.

10. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for conveying the contents of said tank to said storage container, a pipe arranged rotatably along the axis of said storage container said pipe having a plurality of sections arranged in different axial positions along the axis of said storage container, a pipe line having an inlet arranged in said storage container, a pump having a pressure side and a suction side, means for connecting, respectively, said pipe line with said pressure side and said suction side of said pump, means for connecting said pipe line to said pipe, and means for connecting said pipe line to a manure cart.

11. An arrangement for removing dung from stables and the like, comprising in combination: a collecting tank, said tank having an inlet near its top and an outlet near its bottom, pipe means connecting said inlet and said outlet, said pipe means being provided with feed openings for receiving dung, pump means capable of circulating stable liquid through said collecting tank and said pipe means, whereby dung entering said pipe means through said feed openings is flushed by said liquid through said inlet into said collecting tank, a storage container, means for conveying the contents of said tank to said storage container, a pipe arranged rotatably along the axis of said storage container, said pipe having a plurality of sections arranged in different axial positions along the axis of said storage container, a pipe line having an inlet arranged in said storage container, a pump having a pressure side and a suction side, means for connecting, respectively, said pipe line with said pressure side and said suction side of said pump, a manure pile connected to said connecting means, a collecting reservoir connected to said manure pile, and means for connecting said collecting reservoir with said pipe line.

12. An arrangement as claimed in claim 11, circulating means connected to said collecting reservoir, and a fragmentizing and emulsifying device forming part of said circulating means.

13. An arrangement for removing dung from stables and the like, comprising in combination: an inclined dung collecting channel, a collecting tank, said collecting tank having an inlet near its top coupled directly to said channel and an outlet near its bottom, pipe means directly connecting said channel with said outlet, adjustable valve means for closing said inlet and said outlet, and pump means capable of circulating stable liquid through said collecting tank, said channel, and said pipe means, whereby dung entering said channel is flushed by said liquid through said inlet into said collecting tank, said pump means being capable of mixing dung and liquid in said collecting tank to form dung pulp, a storage container, and conveying means extending between said storage container and said collecting tank for conveying said dung pulp from said collecting tank to said storage container, said pump means being connected to said conveying means.

References Cited in the file of this patent

UNITED STATES PATENTS

| | | |
|---|---|---|
| 1,091,251 | Stauffer | Mar. 24, 1914 |
| 1,611,478 | Massey | Dec. 21, 1926 |
| 2,631,899 | Jullien | Mar. 17, 1953 |

FOREIGN PATENTS

| | | |
|---|---|---|
| 5,981 | Great Britain | Apr. 8, 1889 |